(12) United States Patent
Miyano (10) Patent No.: US 7,720,646 B2
(45) Date of Patent: May 18, 2010

(54) SIGNAL PROCESSOR AND TRACKING METHOD OF SIGNAL SEARCH RANGE

(75) Inventor: Tomio Miyano, Yokohama (JP)

(73) Assignee: Ono Sokki Co., Ltd., Kanagawa (JP)

( * ) Notice: Subject to any disclaimer, the term of this patent is extended or adjusted under 35 U.S.C. 154(b) by 136 days.

(21) Appl. No.: 12/012,823

(22) Filed: Feb. 6, 2008

(65) Prior Publication Data

US 2008/0195350 A1 Aug. 14, 2008

(30) Foreign Application Priority Data

Feb. 9, 2007 (JP) .............................. 2007-030090

(51) Int. Cl.
*G06F 15/00* (2006.01)
*G06F 19/00* (2006.01)
(52) U.S. Cl. .............................. 702/189; 702/76; 702/77
(58) Field of Classification Search .................... 702/76, 702/77, 147, 189
See application file for complete search history.

(56) References Cited

U.S. PATENT DOCUMENTS 5,625,362 A * 4/1997 Richardson .................. 342/70

2003/0229469 A1 * 12/2003 Song ........................... 702/145

FOREIGN PATENT DOCUMENTS

| JP | 58-131518 | 8/1983 |
| JP | 63-273065 | 11/1988 |
| JP | 02-021266 | 1/1990 |
| JP | 06-503425 | 4/1994 |
| JP | 09-068542 | 3/1997 |
| JP | 2001-159586 | 6/2001 |
| WO | 93/07496 | 4/1993 |

* cited by examiner

*Primary Examiner*—Bryan Bui
(74) *Attorney, Agent, or Firm*—Dilworth & Barrese, LLP (57) ABSTRACT

A signal processor and a tracking method of a signal search range are provided which can read out precisely a specific spectrum having frequency varied. A signal processor includes an FFT computation portion to compute spectrum data by fast-Fourier-transforming an input signal, a spectrum selection portion to select a specific spectrum, a spectrum search portion to search sequentially the specific spectrum selected by the spectrum selection portion from the spectrum data computed by the FFT computation portion, and a search range computation portion to compute the search range of the spectrum searched by the spectrum search portion based on the frequency of the specific spectrum, in which the search range computation portion computes the search range based on the varied frequency of the specific spectrum and makes it track the varied specific spectrum, when the frequency of the specific spectrum varies.

5 Claims, 5 Drawing Sheets

SIGNAL PROCESSOR AND TRACKING METHOD OF SIGNAL SEARCH RANGE

This application is based on and claims the benefit of priority from Japanese Patent Application No. 2007-030090, filed on 9 Feb. 2007, the content of which is incorporated herein by reference.

BACKGROUND OF THE INVENTION

1. Field of the Invention

This invention relates to a signal processor and a tracking method of signal search range to process an externally input signal.

2. Related Art

The signal processor is provided with various functions (for example, see Japanese Unexamined Patent Application Publication No. Hei 2-21266). The invention of the publication is a signal processor (revolution indicator) to measure the number of revolutions of a revolving motor, which detects a leakage flux as a phenomenon resulted by the revolution of a rotor, finds the spectrum data of the leakage flux by fast Fourier transformation, and finds the number of revolutions of the revolving motor based on the frequency showing the maximum value of the spectrum data.

However, the spectrum data FFT-computed by such a revolution indicator contains not only the main component spectrum (first order component), which becomes the number of revolutions of the revolving motor, but also many spectrums such as half order, second order, and third order. Generally, the spectrum showing the maximum value in the spectrum data becomes the main component of the revolution to be computed, but due to the influence by disturbances, etc. to the revolving motor, or depending on the kind of signals measured as a phenomenon resulting from the revolution used for the measurement, there has been a problem in that the above described spectrums such as half order, second order, and third order spectra becoming larger than the spectrum of the main component causing an incorrect read out that is a different spectrum as the main component spectrum.

Hence, a measure has been taken so that the search range to search the main component spectrum is set to exclude the above described frequency components such as half order, second order, and third order. For example, the lower limit of the search range is set to 0.6 times of the main component and the upper limit is set to 1.8 times of the main component, and on the frequency axis, the spectrums of half order and second order adjacent to the main spectrum (first order component) are excluded. However, with such a setting of the search range, when the number of revolutions of a revolving motor is varied, the spectrums such as half order, and second order other than the main component are included within the search rang to cause the wrong read out of those spectrum as the spectrums of the main component resulted resulting from the number of revolutions of the revolving motor.

To be more precise, when the main component of the revolving motor is 100 Hz and the search range of the main component is set to 60-180 Hz, 50 Hz of the half order component and 200 Hz of second order component are excluded from the search range. However, when the main component of the revolving motor varies from 100 Hz to 150 Hz, within the search range (60-180 HZ), 75 Hz, which is the half order component of the varied main component (150 Hz) is read out, and in the case that the spectrum of the main component (150 Hz) is smaller than that of the half order component (75 Hz), the spectrum of the half order has sometimes ended up to be read out as the main component. Moreover, there has been a problem in that, also when the main component deviated from the search range (60-180 Hz) (for example, 200 Hz), spectra such as half order other than the main component has ended up to be read out.

SUMMARY OF THE INVENTION

This invention is directed to provide a signal processor and a tracking method of signal search range, which can read out precisely a specific spectrum having frequency varied.

This invention solves the above described problems by the following means for solving the problems.

In a first aspect of the present invention, there is provided a signal processor includes an FFT computation portion to compute spectrum data by fast-Fourier-transforming an input signal, a spectrum selection portion to select a specific spectrum, a spectrum search portion to search sequentially the specific spectrum selected by the spectrum selection portion from the spectrum data computed by the FFT computation portion, and a search range computation portion to compute the search range of the spectrum searched by the spectrum search portion based on the frequency of the specific spectrum, in which the search range computation portion computes the search range based on the varied frequency of the specific spectrum and makes it track the varied specific spectrum, when the frequency of the specific spectrum varies.

According to the first aspect of the present invention, the search range of the specific spectrum is computed based on the selected specific frequency of the specific spectrum, and when the frequency of the specific spectrum varies, the search range of the specific spectrum is computed based on the varied frequency of the specific spectrum to track the varied specific spectrum. Therefore, even when the frequency of the specific spectrum varies, it is possible to exclude unnecessary spectra from the search range and to track the specific spectrum precisely without mistaking the search.

The spectrum search portion may search the frequency showing the maximum value of the spectrum data as the above described specific spectrum. According to this, since the spectrum search portion searches the spectrum showing the maximum value of the spectrum data as the specific spectrum, the judgment of the search is easy, thereby making it possible to prevent from wrongly searching different spectra.

The search range computation portion may determine the upper limit of the search range based on the frequency smaller than two times of the frequency of the specific spectrum, and determines the lower limit of the search range based on the a frequency larger than half of the frequency of the specific spectrum. According to this, since the search range computation portion computes the upper limit of the search range as a frequency smaller than two times of the frequency of the specific spectrum, and the lower limit of the search range as a frequency larger than half of the frequency of the specific spectrum, the half order component and the second order component of the specific spectrum can be excluded from the search range, and it is possible to prevent from wrongly searching different spectra.

The signal may be a detected result of a time series physical phenomenon resulting from the revolving movement measured from a measuring object, and the frequency of the specific spectrum selected by the spectrum selection portion is a number of revolutions of the measuring object. According to this, since the signal processor makes the detected results of the time series physical phenomenon resulting from the revolving movement measured from the measuring object be a signal, it is possible to find the number of revolutions of the measuring object from the physical phenomenon resulting from the revolution of the measuring object.

When the specific spectrum is a frequency x times of the revolution frequency of the measuring object, the search range computation portion may compute a width of the search range based on a frequency which is the frequency of the specific spectrum divided by x, and may set the computed search range width as the search range of the frequency of the specific spectrum. According to this, since the search range computation portion computes, when the specific spectrum is a frequency x times of the revolution frequency of the measuring object, the width of the search range is computed based on the frequency which is the frequency of the specific spectrum divided by x, and sets the computed search range width as the search range of the frequency of the specific spectrum, and it is possible not only to exclude the spectrums of half order components and second order components, but also to exclude the spectrum of the revolution frequency and half order and second order spectra thereof from the computed search range, thereby enabling precise searching of the specific spectrum by the spectrum search portion.

A set input portion may be provided, which sets and inputs to the search range computation portion, the ratio of the revolution frequency and the frequency of the specific spectrum. According to this, since the signal processor is equipped with the set input portion which sets the ratio of the number of revolutions of the measuring object and the frequency of the specific spectrum, and inputs it to the search range computation portion, it is possible to make it automatically compute the search range of the specific spectrum based on the frequency of the specific spectrum and the number of revolutions of the measuring object.

In the second aspect of the present invention, there is provided a tracking method of signal search range includes: a FFT computation step of computing a spectrum data by fast-Fourier-transforming an input signal; a spectrum selection step of selecting a specific spectrum; a spectrum search step of searching sequentially the specific spectrum selected by the spectrum selection step from the spectrum data computed by the FFT computation step: and a search range computation step of computing the search range of the spectrum searched by the spectrum search step based on the frequency of the specific spectrum, wherein the search range computation step computes the search range based on a varied frequency of the specific spectrum and enables tracking of the varied specific spectrum, when the frequency of the specific spectrum varies.

DETAILED DESCRIPTION OF THE INVENTION

Below, referencing the drawings, etc., this invention is further described citing the embodiments of this invention.

Embodiment 1

Figure 1:
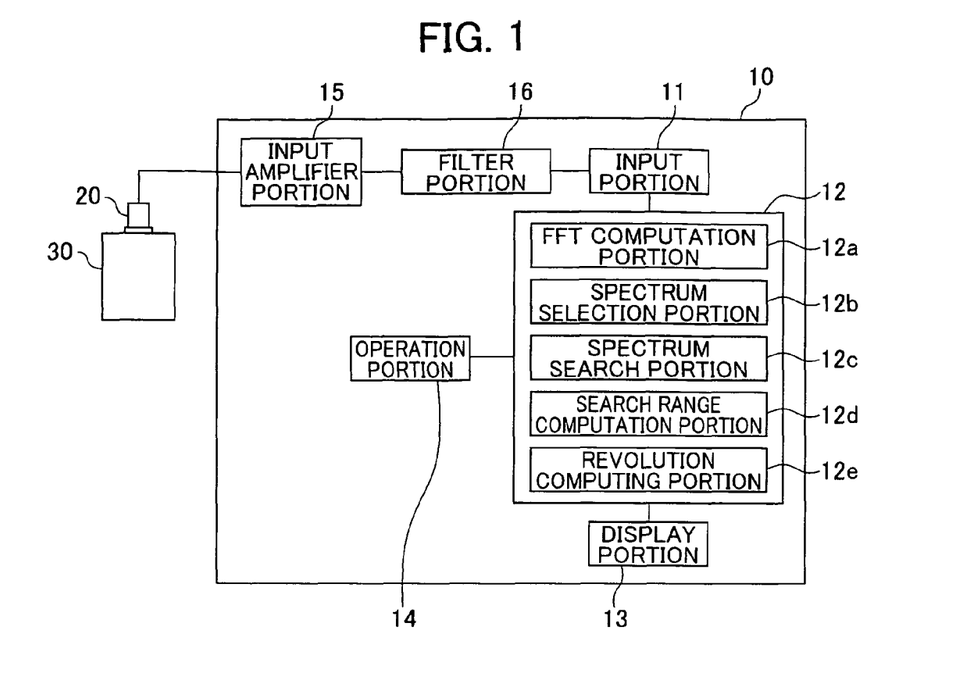
FIG. 1 is a drawing showing a revolution indicator in which the signal processor of this invention is made to be the embodiment 1.
Figure 2:
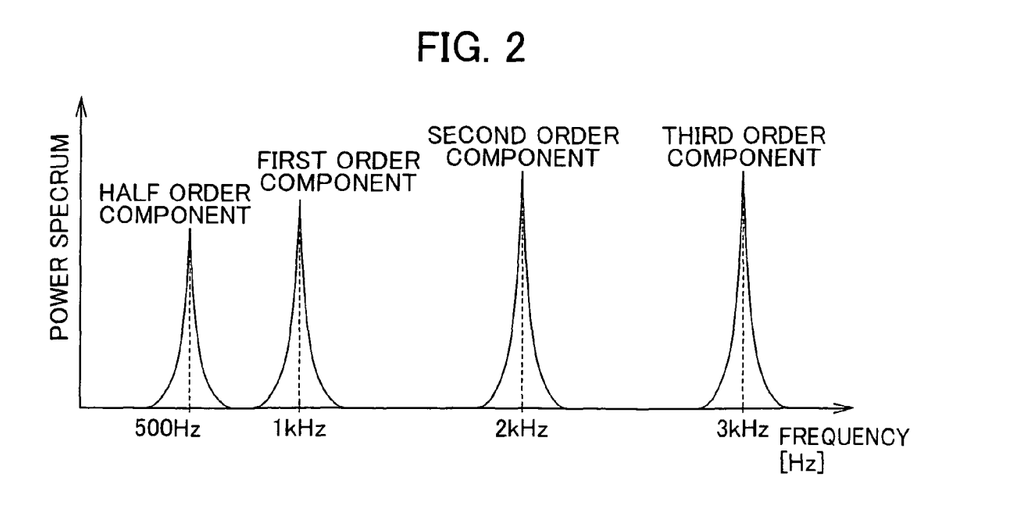
FIG. 2 is a drawing showing spectrum data processed by the computation control portion.
Figure 3A:
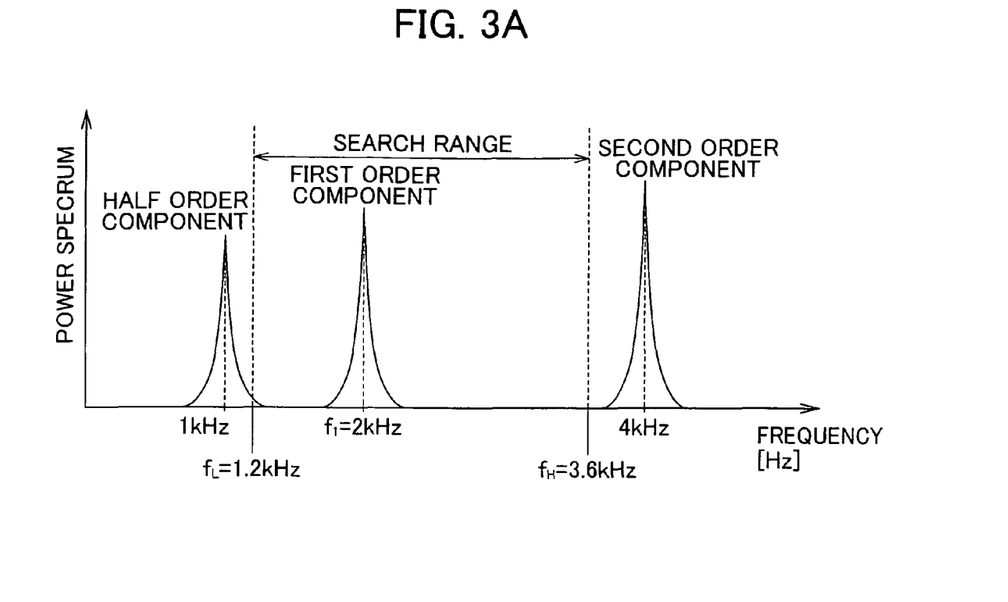
FIG. 3A and FIG. 3B are drawings illustrating the search range set by the search range computation portion.
Figure 3B:
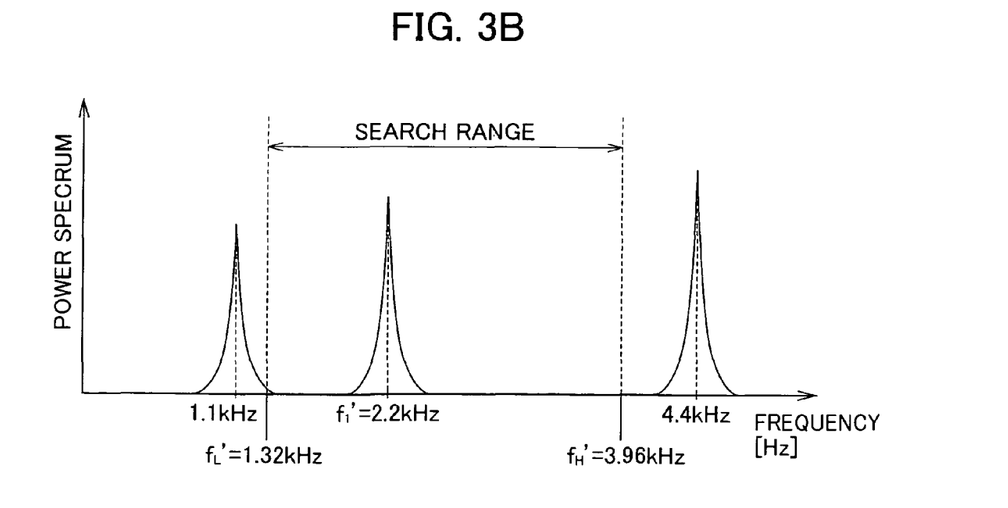

FIG. 1 is a drawing showing a revolution indicator in which the signal processor of this invention is made to be the embodiment 1. FIG. 2 is a drawing showing the spectrum data processed by the computation control portion. FIG. 3 is a drawing describing the search range set by the search range computation portion.

The revolution indicator (signal processor) 10 has an input portion 11, a computation control portion 12, a display portion 13, an operation portion 14, an input amplifier portion 15, and a filter portion 16, and is a measuring instrument to measure the number of revolutions of a revolving mechanism provided inside of a compressor 30 based on the vibration data (signal) detected by a vibration meter 20 provided in the compressor 30. In this embodiment, the description is provided assuming that the relation between the frequency f1 of the spectrum of the main component (first order component) based on the vibration data of the compressor 30 detected from the vibration meter 20 and the revolution frequency of the revolving mechanism of the compressor 30 is 1:1.

The input portion 11 is an A/D converter which makes the time series vibration data detected by the vibration meter 20 discrete, and inputs it to the computation control portion 12 of the revolution indicator 10.

The computation control portion 12 has an FFT computation portion 12a, a spectrum selection portion 12b, a spectrum search portion 12c, a search range computation portion 12d, and a revolution computing portion 12e, and is a control circuit to totally control each of the portions of the revolution indicator 10. In addition, the measuring time can be set by the operation portion 14, described later.

The FFT computation portion 12a is a computing circuit which computes the spectrum data of vibration by fast-Fourier-transforming (FFT) the discrete vibration data input successively from the input portion 11.

The spectrum selection portion 12b is a circuit to select the spectrum (specific spectrum) of the main component at the initial operation of the compressor 30, which is the measuring object. The spectrum selection portion 12b prompts a worker to select the spectrum of main component resulting from the number of revolutions at the initial operation of the compressor 30 based on the spectrum data FFT-computed by the FFT computation portion 12a. To be more precise, as shown in FIG. 2, it displays the spectrum data computed by the FFT computation portion 12a in the display portion 13, and prompts the worker to select the spectrum of the main component from the displayed spectrum data. In a case where the number of revolutions at the initial operation of the compressor 30 is previously known, the frequency f1 of the spectrum of the main component can be input from the operation portion 14, described later.

The spectrum search portion 12c is a circuit to search sequentially the spectrum of the main component selected by the spectrum selection portion 12b from the spectrum data computed by the FFT computation portion 12a while measuring the number of revolutions of the compressor 30. Here, the spectrum of the main component is not searched from the whole of the spectrum data, but searched from the search range computed by the search range computation portion 12d, described later. In addition, the search of the spectrum of the main component is performed by judging the spectrum showing the maximum value in the search range as the spectrum of the main component.

The search range computation portion 12d is a computing circuit which computes the spectrum of the main component searched by the spectrum search portion 12c. More specifically, in the computed spectrum data, as shown in FIG. 2, other than the main component (first order component), such spectra as half order component, second order component, and third order component are detected.

In this embodiment, in order not to read out the spectrum of the half order component and the second order component adjacent to the main component as the spectrum of the main component, the search range is automatically set so as to exclude the spectrum of the half order component and the second order component. More specifically, as shown in FIG. 3A, when the frequency f1 of the spectrum of the main component (first order component), at the initial operation of the compressor 30, is 2 kHz, the spectrum of the half order component and the second order component appear as 1 kHz and 4 kHz, respectively. Hence, the search range is needed to be set so as to exclude the half order component and the second order component, for example, by setting the lower limit frequency $f_L$ to be decreased by 40% (0.6 times of f1) (see the following equation 1), and by setting the lower limit frequency $f_H$ to be increased by 80% (1.8 times of f1) (see the following equation 2), thereby excluding the spectrum of the half order component and the second order component.

$$f_L = f1 - 0.4f1 = 0.6f1 \quad \text{(Equation 1)}$$

$$f_H = f1 + 0.8f1 = 1.8f \quad \text{(Equation 2)}$$

Hence, the search range computation portion 12d computes the search range using the above Equation 1 and Equation 2, based on the frequency of the spectrum of main component selected by the spectrum selection portion 12b. For example, as shown in FIG. 3A, when the frequency f1 of the spectrum of the main component is 2 kHz, the lower limit frequency $f_L$ of the search range becomes 1.2 kHz and the upper limit frequency $f_H$ becomes 3.6 kHz.

Moreover, by the above computation, when frequency f1 (number of revolutions) of the spectrum of the main component at the initial operation of the compressor 30 is varied, the search range computation portion 12d can make the search range track the variation of the frequency f1 of the spectrum of the main component by the above Equation 1 and Equation 2. For example, as shown in FIG. 3B, when the frequency f1 of the spectrum of main component varied from 2 kHz to 2.2 kHz (f1'), the half order component becomes 1.1 kHz, the second order component becomes 4.4 kHz, where the half order component and the second order component are excluded from the search range (1.2 kHz-3.6 kHz). In addition, the search range computation portion 12d computes by the Equation 1 and the Equation 2 so that the lower limit frequency $f_L$' and the upper limit frequency $f_H$' after variation track f1' based on the varied frequency (f1'=2.2 kHz). Here, the lower limit frequency $f_L$' becomes 1.32 kHz, and the upper limit frequency $f_H$' becomes 3.96 kHz.

When the varied frequency f1' (2.2 kHz) of the spectrum of the main component further varied (for example, 2.4 kHz) the half order component (1.2 kHz) and the second order component (4.8 kHz) of the varied frequency is excluded by the search range (1.32($f_L$')-3.96 kHz ($f_H$')), which is made to track f1'. Here, in the spectrum data of FIG. 2 and FIG. 3, the axis of abscissas is made to be frequency f (Hz), and the axis of ordinate to be power spectrum (PS).

The revolution computing portion 12e computes the number of revolutions of the compressor 30 based on the frequency f1 showing the spectrum of the main component searched by the spectrum search portion 12c, and makes the computed results display in the display portion 13. In this embodiment, the searched frequency f1 (Hz: the number of vibrations per 1 second) of the main component is computed as the number of revolutions per minute (r/min).

The operation portion 14 is equipped with a numeric pad and a plurality of buttons for the worker to give instructions of the operation to the revolution indicator 10, which makes it possible to input the frequency value of f1, and set the measuring time, when the frequency f1 of the main component of the spectrum is previously known.

The input amplifier 15 is an amplifier to amplify the vibration data detected from the vibration mater 20.

The filter portion 16 is an AAF (anti-aliasing filter) to remove the aliasing noise contained in the vibration data amplified by the input amplifier portion 15.

The vibration meter 20 is fixed to the housing of the compressor 30, and is an accelerometer which detects the vibration of the revolving mechanism of the compressor 30 as the vibration data of acceleration.

The compressor 30 has a revolution mechanism inside, and is a device to increase the pressure by compressing gas or liquid by the revolution mechanism.

Figure 4:
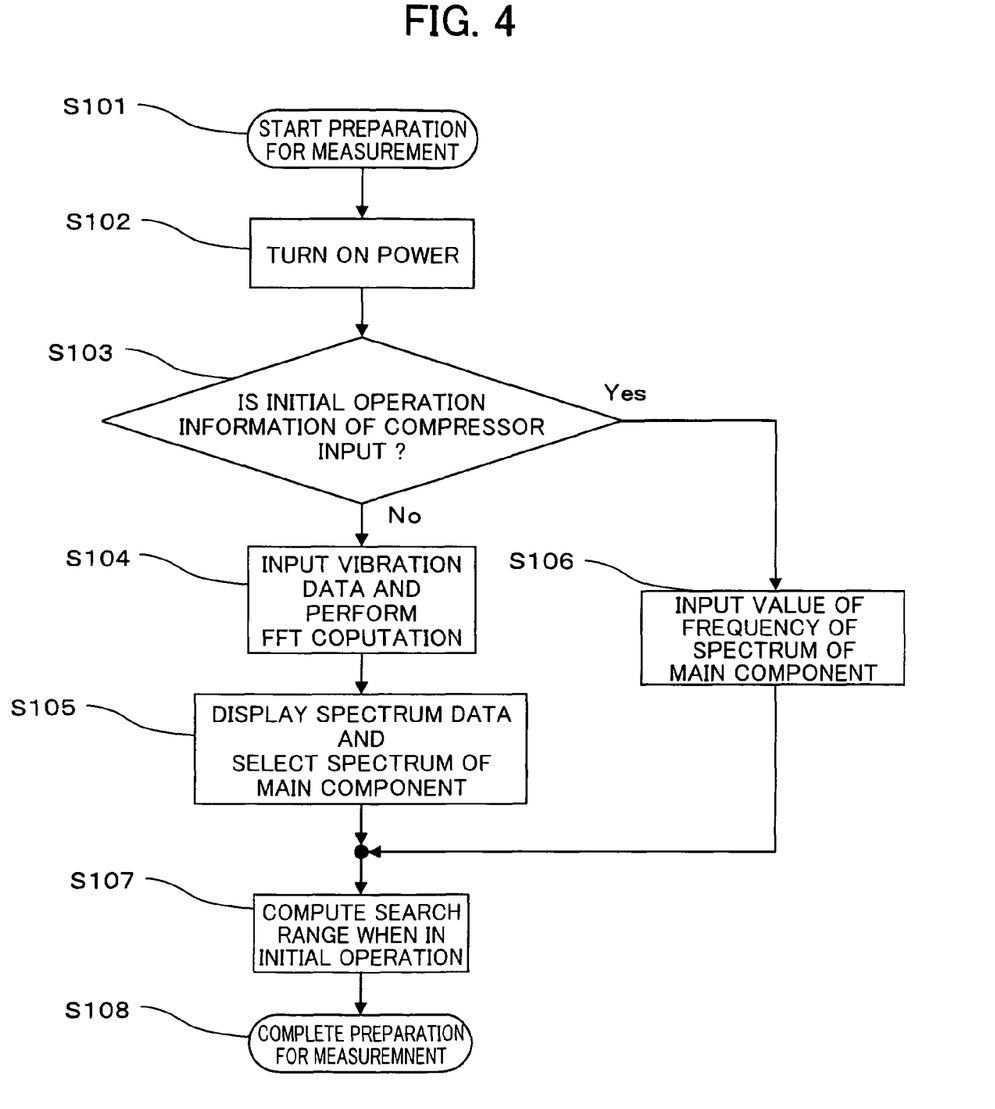
FIG. 4 shows a flow diagram showing the flow of the preparation for the measurement of the revolution indicator.

Next, the preparation for the measurement of the number of revolutions of the compressor 30 of the revolution indicator 10 is described. FIG. 4 shows a flow diagram showing the flow of the preparation for the measurement of the revolution indicator 10.

The worker arranges the vibration meter 20 to the compressor 30 properly, and when the preparation for the measurement of the number of revolutions of the compressor 30 (S101) starts, the worker turns on the power of the revolution indicator 10 (S102).

When the power is turned on, it is checked whether the frequency f1 of the spectrum of main component at the initial operation of the compressor 30 is input or not. When the frequency f1 of the spectrum of main component at the initial operation is not previously known and cannot be input (S103: NO), the instruction to perform a trial run on the compressor 30 is displayed to the worker through the display portion 13. When the compressor 13 is tested, the computation control portion 12 computes the spectrum data by inputting the vibration data when in the trial run (initial operation) of the compressor 30 detected by the vibration meter 20 to the FFT computation portion 12a (S104). Successively, the computed spectrum data is displayed as shown in FIG. 2 in the display portion 13 to prompt the worker to select the spectrum (2 kHz) of the main component of the compressor 30 (S105).

When the value of the frequency f1 of the spectrum of the main component at the initial operation of the compressor 30 is previously known and its value is input (for example, f1=2 kHz, S103: Yes), the computation control portion 12 prompts the worker to input the value of f1 of the spectrum of the main component from the operation portion 14 (S106).

When the spectrum of the main component of the compressor 30 is selected or input, the search range computation portion 12d of the computation control portion 12 computes and finds (S107) the search range (in this embodiment, 1.2 kHz-3.6 kHz) for searching the spectrum of the main component at the time of measurement start, and completes the preparation for the measurement (S108).

Figure 5:
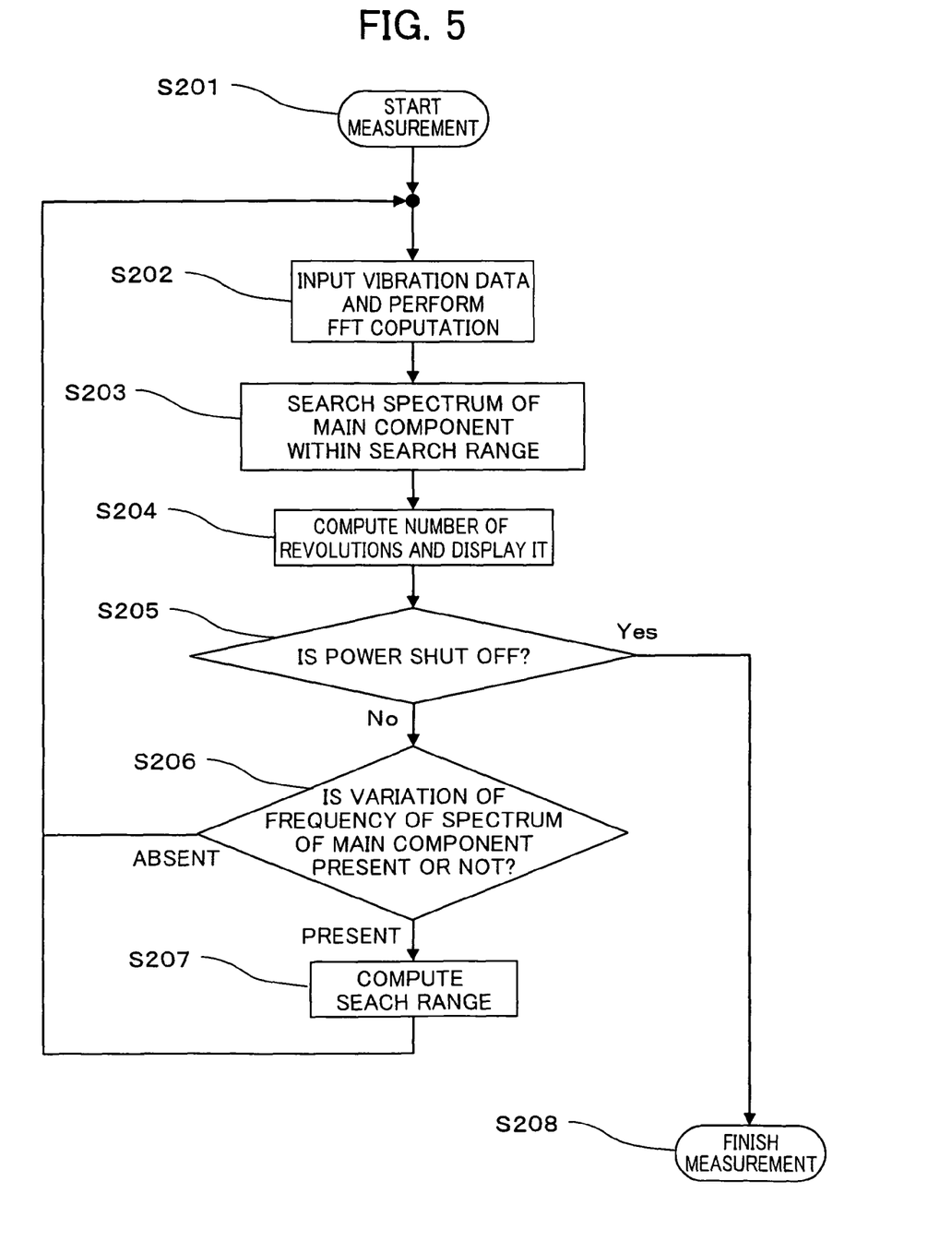
FIG. 5 is a flow diagram showing the flow from the start to the end of the measurement of the compressor 30.

Next, the operation when the revolution indicator 10 measures the number of revolutions of the compressor 30 is described. FIG. 5 is a flow diagram showing the flow from the start to the end of the measurement of the compressor 30.

When the preparation for the measurement is completed as described above, the revolution indicator 10 starts the measurement of the number of revolutions of the compressor 30 (S201). First, when the operation of the compressor 30 is started to make the vibration meter 20 detect successively the vibration data, the computation control portion 12 of the revolution indicator 10 makes the FFT computation portion 12a compute the spectrum data by inputting the detected vibration data (S202). Next, as shown in FIG. 3A, the spectrum of the main component is searched within the search range (1.2 kHz-3.6 kHz) found at the time of the preparation for the measurement by the spectrum search portion 12c (S203). When the spectrum of the main component is searched, the computation control portion 12 makes the revolution computing portion 12e convert the frequency f1 [Hz] of the searched spectrum of the main component into the number of revolutions per minute (r/min) and displays thereof in the display portion 13 (S204).

Next, the computation control portion 12 checks, while the power is continuously turned on (S205: No), whether the frequency f1 of the searched spectrum of main component is varying or not (S206). When the frequency is varying (S206: Yes), the search range (for example, 1.32 kHz-3.96 kHz) is computed based on the varied frequency f1' (for example 2.2 kHz) (S207), as shown in FIG. 3B, using the computed search range, the spectrum of main component is searched from the spectrum data computed by the FFT computation portion 12a (S202, S203), and the number of revolutions is displayed (S204).

If the frequency is not varying (S206: No), using continuously the search range the same as that at the initial operation, the spectrum of the main component is searched from the spectrum data computed by the FFT computation portion 12a (S202, S203) and the number of revolutions is displayed (S204).

When the power is shut off (S205: Yes), the measurement of the number of revolutions of the compressor 30 finishes (S208).

As described above, there are the following effects in the revolution indicator of this embodiment.

(1) Since the revolution indicator 10 computes the search range of the spectrum of the main component based on the frequency f1 of the selected spectrum of main component, and when the frequency f1 of the spectrum of main component varies, it computes the search range based on the frequency f1' of the spectrum of main component, and makes the search range track the varied spectrum of the main component, and even when the frequency f1 of the spectrum of the main component varies, unnecessary spectra such as half order component and second order component can be excluded from the search range, thereby enabling searches precisely without causing the search mistake of the spectrum of main component.

(2) Since the spectrum search portion 12c searches the spectrum showing the maximum value of the spectrum data within the search range, the judgment of the search is easy, making it possible to prevent from wrongly searching different spectrums such as half order component and second order component.

(3) Since the search range computation portion 12d computes the upper limit of the search range as a frequency $f_H$ which is 1.8 times of the frequency f1 of the spectrum of main component, and computes the lower limit of the search range as a frequency $f_L$ which is 0.6 times of the frequency f1 of the spectrum of main component, the half order component and the second order component of the spectrum of main component can be excluded from the search range, thereby enabling prevention of searching wrongly the different spectrums.

(4) Since the signal processor 10 detects the time series vibration data resulting from the revolving movement measured at the compressor 30, the number of revolutions of the compressor 30 can be easily measured from the vibration data of the vibration meter 20 arranged on the compressor 30.

Embodiment 2

Figure 6:
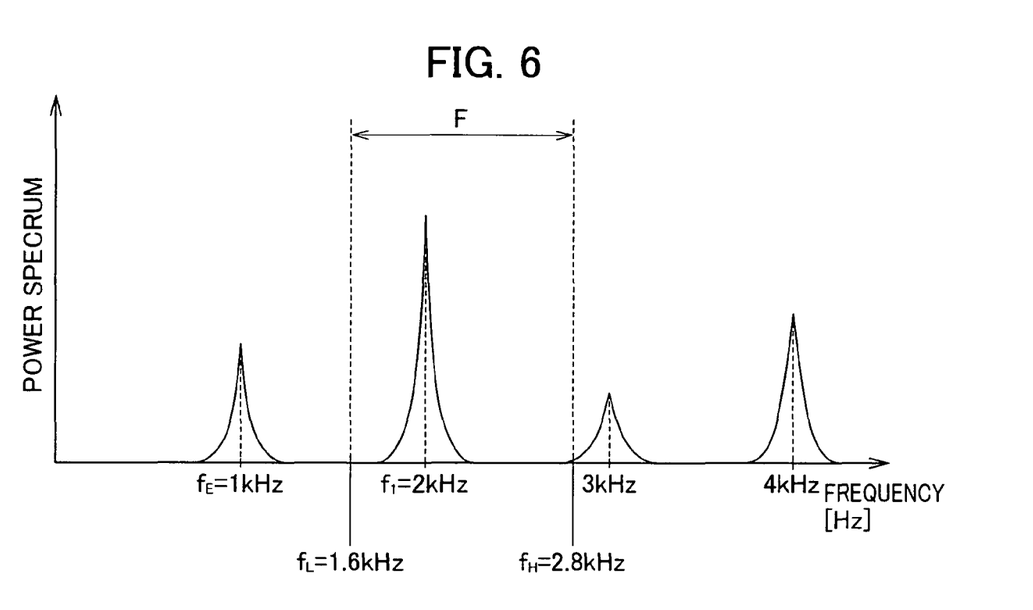
FIG. 6 is a drawing illustrating the search range by the search range computation portion in the embodiment 2 of this invention.

FIG. 6 is a drawing illustrating the search range by the search range computation portion in the embodiment 2 of this invention. In the description of the embodiment 2, regarding portions performing a function similar to the first embodiment, by providing the same reference numerals or unified reference numerals to the tail end, redundant descriptions and drawings are accordingly omitted.

The signal processor of the embodiment 2, as well as is in the case with the embodiment 1, the revolution indicator is taken as an example, with the different points between the revolution indicator 10-2 of the embodiment 2 and the revolution indicator 10 of the embodiment 1 are being that the measurement object of the embodiment 2 is an four-cycle, four-cylinder engine 30-2 for automobiles, and that the computation method of search range of the search range computation portion 12d of the computation control portion 12 of the embodiment 2 is equipped with an additional function constituting a search range computation portion 12d-2.

The revolution indicator 10-2 has an input portion 11, a computation control portion 12, a display portion 13, an operation portion 14, an input amplifier portion 15, and a filter portion 16, and is a measuring instrument to measure the number of revolutions of the engine 30-2 based on the vibration data (signal) detected by the vibration meter 20 arranged on the engine 30-2.

The engine 30-2 is, as described above, a four-cycle internal combustion engine with four-cylinders for automobiles. The engine 30-2 intakes the mixture of fuel and air into the each cylinder, and compresses, ignites, combusts, and expands the intake gas mixture by pistons provided in the cylinder to reciprocate the piston and to revolve a crank shaft coupled to the piston. Generally, in the a four-cycle engine, one explosion (combustion, expansion) occurs while for every two revolution of the crank shaft revolves two times. In the case of a four-cycle engine with four cylinders, since the explosion of the cylinder occurs alternately, viewing from the whole engine 30-2, two explosions occur per every one revolution of the crank shaft. Here, the number of revolutions of the engine 30-2 (revolving frequency) is the number of revolutions (revolving frequency) of the crank shaft.

The vibration meter 20 arranged on the meter 20 detects mainly the vibration of the explosion occurring in the engine 30-2, but it also detects the vibration accompanying the revolution of the crank shaft, because it is the vibration occurring in the engine 30-2, although minute.

An additional function provided in the search range computation portion 12d-2 is a function which reflects a ratio to the search range computation, when the relation between the frequency f1 of the spectrum of the vibration occurring by the explosion of the engine 30-2 and the revolving frequency $f_E$ of the engine 30-2 is in a ratio other than 1:1 (in this embodiment, 2:1).

More specifically, when the crank shaft of the engine 30-2 revolves at 1 kHz, in the spectrum data based on the vibration of the explosion of the engine 30-2 detected by the vibration meter 20, the spectrum of 2 kHz appears as the main component, and as the half order component, 1 kHz, and as the second order component, a 4 kHz spectrum also appear. In the spectrum data based on the revolution vibration of the crank shaft, a 1 kHz spectrum data appears as the main component, and as the second order, third order, and fourth order components, 3 kHz and 4 kHz spectra also appear. The spectra of vibration data by this explosion and the revolution is synthesized and appears as the spectrum data shown in FIG. 6.

As described above, since the vibration meter 20 detects the vibration by the explosion with higher sensitivity than the vibration accompanying the revolution of the crank shaft, in the spectrum data, as shown in FIG. 6, the spectrum based on the explosion appears large, and the vibration based on the revolution of the crank shaft appears as a smaller spectrum than the spectrum of the explosion. In other words, since the 2 kHz spectrum contains the main component of the explosion and the second order component of the revolution of the engine 30-2, it tends to be larger in the amplitude than the 1 kHz spectrum containing the half order component of the explosion and the main component of the revolution. Accordingly, it is the most efficient way to make the spectrum search portion 12c search the 2 kHz spectrum as the main spectrum, and it makes possible to search precisely the main spectrum.

As described above, when the 2 kHz (f1) spectrum is searched as the main spectrum, if the search range is found by the computation using the Equation 1 and the Equation 2 described in the embodiment 1, it can be found that the lower limit frequency is 1.2 kHz and the upper limit frequency is 3.6 kHz. However, in this search range (1.2 kHz-3.6 kHz), the second order component (2 kHz) and the third order component (3 kHz) of the revolution frequency $f_E$ (1 kHz) resulting from the revolution of the crank shaft end up to be included, and there is a possibility of the search mistake of the spectrum of the main component by the spectrum search portion 12c-2.

With that, the search range computation portion 12d-2 computes a width F of the search range resulting from the revolution frequency (1 kHz) of the engine 30-2, and computes to apply the width F to the spectrum of the main component (2 kHz). More specifically, the lower limit of the frequency $f_L$ and the upper limit of the frequency $f_H$ of the search range are computed by the Equation 3 and the Equation 4 shown below.

$f_L = f1 - 0.4 f_E$ (Equation 3)

$f_H = f1 + 0.8 f_E$ (Equation 4)

By the Equation 3 and the Equation 4, it is possible to use the width F of the search range computed being based on the revolution frequency $f_E$ of the engine 30-2 with regard to the frequency f1 of the main component of the spectrum, thereby enabling to search the spectrum of the main component efficiently and precisely. In this embodiment, as shown in FIG. 6, since the frequency f1 of the spectrum of the main component is 2 kHz, and the revolution frequency $f_E$ of the engine 30-2 is 1 kHz, and by the Equation 3 and the Equation 4, the frequency $f_L$ of the lower limit of the search range of the main component is computed to be 1.6 kHz, and the frequency $f_H$ of the upper limit is computed to be 2.8 kHz.

Moreover, the search range computation portion 12d-2 is made so that the value of the ratio x (in this embodiment x=2) of the frequency f1 of the spectrum of the main component of the vibration occurring by the explosion of the engine 30-2 and the revolution frequency $f_E$ of the engine 30-2 can be input by the worker from the operating portion 14. For example, by the Equation 5 shown below, and the Equation 3 and the Equation 4, the search range can be computed automatically.

$f_E = f1/x$ (equation 5)

In this case, similar to Embodiment 1, when the revolution frequency $f_E$ of the object of measurement and the frequency f1 of the spectrum of the main component of the vibration data is 1:1, by inputting x=1, a computation result the same as Embodiment 1 can be found.

As described above, the revolution indicator 10-2 is particularly usable when the frequency of the signal (vibration data) of the physical phenomenon resulting from the revolving movement of the measuring object and the revolving frequency of the measuring object is in a specified ratio x (in this embodiment, x=2), and is capable of measuring the number of revolutions precisely without causing an erroneous search of the frequency f1.

From the above description, the revolution indicator of the Embodiment 2 has following effects.

(1) Since, when the spectrum of the main component of the vibration data detected by the vibration meter 20 is two times of the frequency of the revolving frequency $f_E$ of the engine 30-2, the search range computation portion 12d-2 computes the width F of the search range based on the frequency which is the frequency f1 of the main component divided by two, and sets the computed width F of the spectrum of the main component as the search range of the frequency f1 of the spectrum of main component, it can exclude not only the half order component and the second order component of the spectrum of the main component, but also the spectrum of the second order component and the third order component of the revolving frequency $f_E$ of the engine 30-2 from the computed search range, and by the spectrum search portion 12c, the spectrum of the main component can be searched precisely.

(2) Since the revolution indicator 10-2 is equipped with the operation portion 14, which sets the ratio x of the revolving frequency $f_E$ of the engine 30-2 and the frequency f1 of the spectrum of the main component and inputs it to the search range computation portion 12d-2, the search of the spectrum of the main component can be computed automatically based on the revolving frequency $f_E$ of the engine 30-2.

EXAMPLE OF MODIFICATION

Not to be limited to the embodiment described above, various modifications or changes can be possible, and are included within the scope of this invention.

(1) In each of the embodiments, as a means to detect the number of revolutions, the vibration data measured by the vibration meter 20 is used, but alternatives thereof may be used. For example, as the number of revolutions of the engine 30-2 of the Embodiment 2, not the vibration of the engine 30-2, but acoustic pressure data which is the detection of exhaust noise of combustion gas of the engine 30-2 using an acoustic pressure meter can be used.

(2) In each of the embodiments, for a signal processor, a revolution indicator is taken as an example, but other measuring instruments, etc. can be used.

(3) In the embodiment 2, the revolution indicator 10-2 measures the number of revolutions of the engine 30-2, but it may be used for other measuring objects.

For example, it is possible to make a quadrupole revolving motor be an object, to detect the leakage magnetic flux of the rotor of the revolving motor, and to compute the number of revolutions based on the detected data. In this case, the signal of the leakage magnetic flux detected by a magnetic sensor is detected four times per one revolution, because the rotor of the revolving motor is quadrupole. In other words, the frequency of the signal of the magnetic sensor becomes four times (x=4) of the revolving frequency of the revolving motor, and the search range can be computed by the above Equations from 3 to 5.

What is claimed is:

1. A signal processor, comprising:
an FFT computation portion for computing spectrum data by fast-Fourier-transforming an input signal resulting from the revolving movement measured from a measuring object;
a spectrum selection portion for selecting a specific spectrum corresponding to a frequency based on a number of revolutions of the measuring object:
a spectrum search portion for searching sequentially the specific spectrum selected by the spectrum selection portion from the spectrum data computed by the FFT computation portion; and
a search range computation portion for computing a search range of the spectrum searched by the spectrum search portion based on a frequency of the specific spectrum, the search range computation portion determining an upper limit of the search range based on a frequency less than two times a frequency of the specific spectrum, and determining a lower limit of the search range based on a frequency larger than half of the frequency of the specific spectrum,
wherein, when the frequency of the specific spectrum varies, the search range computation portion computes the search range based on a varied frequency of the specific spectrum and makes the search range track the varied specific spectrum.

2. The signal processor according to claim 1,
wherein the spectrum search portion searches a frequency showing a maximum value of the spectrum data as the specific spectrum.

3. A signal processor, comprising:
an FFT computation portion for computing spectrum data by fast-Fourier-transforming an input signal resulting from the revolving movement measured from a measuring object;
a spectrum selection portion for selecting a specific spectrum corresponding to a frequency based on a number of revolutions of the measuring object:
a spectrum search portion for searching sequentially the specific spectrum selected by the spectrum selection portion from the spectrum data computed by the FFT computation portion; and
a search range computation portion for computing a search range of the spectrum searched by the spectrum search portion based on a frequency of the specific spectrum, wherein
when the specific spectrum is a frequency equal to a predetermined number of times of a revolution frequency of the measuring object,
the search range computation portion computes a width of the search range based on a frequency which is the frequency of the specific spectrum divided by the predetermined number, and sets the width of the search range thus-computed as the search range of the frequency of the specific spectrum, and
the search range computation portion commutes the search range based on a varied frequency of the specific spectrum and enables tracking of a varied specific spectrum, when the frequency of the specific spectrum varies.

4. The signal processor according to claim 3, wherein
a set input portion is provided, which sets and inputs to the search range computation portion a ratio of the revolution frequency and the frequency of the specific spectrum.

5. A tracking method of signal search range includes:
a FFT computation step of computing a spectrum data by fast-Fourier-transforming an input signal resulting from revolving movement measured from a measuring object;
a spectrum selection step of selecting a specific spectrum corresponding to a frequency based on a number of the revolutions of the measuring object;
a spectrum search step of searching sequentially the specific spectrum selected by the spectrum selection step from the spectrum data computed by the FFT computation step; and
a search range computation step of computing the search range of the spectrum searched by the spectrum search step based on a frequency of the specific spectrum, wherein
the search range computation step computes the search range based on a varied frequency of the specific spectrum and enables tracking of the varied specific spectrum, when the frequency of the specific spectrum varies, and
the search range of the spectrum is defined by at least one of the following (i) and (ii):
(i) an upper limit of the search range is based on a frequency less than two times a frequency of the specific spectrum and a lower limit of the search range is based on a frequency larger than half of the frequency of the specific spectrum; and
(ii) a width of the search range is based on a frequency which is the frequency of the specific spectrum divided by a predetermined value, and sets the width of the search range thus-computed as the search range of the frequency of the specific spectrum.

* * * * *